US010589339B2

(12) United States Patent
Ochiai et al.

(10) Patent No.: US 10,589,339 B2
(45) Date of Patent: Mar. 17, 2020

(54) METHOD FOR MANUFACTURING BLISK, AND BLISK INTERMEDIATE PRODUCT

(71) Applicants: IHI Corporation, Koto-ku (JP); Endo Manufacturing Co., Ltd., Tsubame-shi (JP)

(72) Inventors: Hiroyuki Ochiai, Tokyo (JP); Nobutaka Yanagidani, Tokyo (JP); Rui Kondo, Niigata (JP)

(73) Assignees: IHI Corporation, Koto-ku (JP); Endo Manufacturing Co., Ltd., Tsubame-shi (JP)

( * ) Notice: Subject to any disclaimer, the term of this patent is extended or adjusted under 35 U.S.C. 154(b) by 27 days.

(21) Appl. No.: 15/951,364

(22) Filed: Apr. 12, 2018

(65) Prior Publication Data

US 2018/0250733 A1 Sep. 6, 2018

Related U.S. Application Data

(63) Continuation of application No. PCT/JP2016/081059, filed on Oct. 20, 2016.

(30) Foreign Application Priority Data

Oct. 21, 2015 (JP) .................................. 2015-206969

(51) Int. Cl.
*B21J 1/04* (2006.01)
*B21J 5/02* (2006.01)
(Continued)

(52) U.S. Cl.
CPC ................. *B21J 1/04* (2013.01); *B21J 5/022* (2013.01); *B21K 1/36* (2013.01); *B21K 3/04* (2013.01);
(Continued)

(58) Field of Classification Search
CPC ..... B21J 1/04; B21J 5/022; B21K 1/36; B21K 3/04; B23P 15/02; B23P 15/006;
(Continued)

(56) References Cited

U.S. PATENT DOCUMENTS 5,795,413 A   8/1998  Gorman
6,110,302 A   8/2000  Gorman
(Continued)

FOREIGN PATENT DOCUMENTS

CN   101691008        4/2010
GB     717163 A      10/1954
(Continued)

OTHER PUBLICATIONS

International Search Report dated Dec. 27, 2016 in PCT/JP2016/081059 filed Oct. 20, 2016.
(Continued)

*Primary Examiner* — Bayan Salone
(74) *Attorney, Agent, or Firm* — Oblon, McClelland, Maier & Neustadt, L.L.P.

(57) ABSTRACT

A method for manufacturing a blisk includes an intermediate product molding step of molding a blisk intermediate product including a circular disk-corresponding part, a plurality of rotor blade-corresponding parts, and bridges each connecting a front edge of one of each pair of the rotor blade-corresponding parts adjacent to each other and a rear edge of the other one of the rotor blade-corresponding parts. The method for manufacturing the blisk further includes a disk finishing step of cutting the disk-corresponding part so as to finish the disk-corresponding part into the disk in a product form, and a rotor blade finishing step of cutting each bridge so as to finish the respective rotor blade-corresponding parts into the respective rotor blades in a product form.

3 Claims, 9 Drawing Sheets

(51) Int. Cl.
  *B21K 3/04*    (2006.01)
  *B23P 15/02*   (2006.01)
  *B23P 15/00*   (2006.01)
  *F01D 5/10*    (2006.01)
  *F01D 5/14*    (2006.01)
  *F01D 5/26*    (2006.01)
  *B21K 1/36*    (2006.01)
  *F01D 5/34*    (2006.01)
  *F02C 7/143*   (2006.01)

(52) U.S. Cl.
  CPC ............ *B23P 15/006* (2013.01); *B23P 15/02* (2013.01); *F01D 5/10* (2013.01); *F01D 5/142* (2013.01); *F01D 5/26* (2013.01); *F01D 5/34* (2013.01); *F02C 7/143* (2013.01); *F05D 2230/10* (2013.01); *F05D 2230/14* (2013.01); *F05D 2230/21* (2013.01); *F05D 2230/211* (2013.01); *F05D 2230/25* (2013.01); *F05D 2230/53* (2013.01); *F05D 2230/61* (2013.01); *F05D 2250/183* (2013.01)

(58) Field of Classification Search
  CPC ... F01D 5/10; F01D 5/142; F01D 5/26; Y10T 29/49325; Y10T 29/49327
  See application file for complete search history.

(56) References Cited

U.S. PATENT DOCUMENTS

| | | | |
|---|---|---|---|
| 8,464,425 B2* | 6/2013 | Berlanger | B23C 3/18 29/418 |
| 2004/0124181 A1 | 7/2004 | Wei et al. | |
| 2006/0266801 A1 | 11/2006 | Tonks et al. | |
| 2011/0023300 A1* | 2/2011 | Berlanger | B23C 3/18 29/889.23 |
| 2011/0041334 A1 | 2/2011 | Berlanger et al. | |

FOREIGN PATENT DOCUMENTS

| | | |
|---|---|---|
| JP | 2006-297482 | 11/2006 |
| JP | 2009-197649 | 9/2009 |
| JP | 2011-516280 | 5/2011 |
| JP | 2011-517627 | 6/2011 |
| JP | 4906229 | 3/2012 |

OTHER PUBLICATIONS

Written Opinion dated Dec. 27, 2016 in PCT/JP2016/081059 filed Oct. 20, 2016.
Extended European Search Report dated Apr. 25, 2019 in Patent Application No. 16857498.6, 8 pages.

* cited by examiner

METHOD FOR MANUFACTURING BLISK, AND BLISK INTERMEDIATE PRODUCT

CROSS REFERENCE TO RELATED APPLICATIONS

This application is a continuation application of International Application No. PCT/JP2016/081059, filed on Oct. 20, 2016, which claims priority to Japanese Patent Application No. 2015-206969, filed on Oct. 21, 2015, the entire contents of which are incorporated by reference herein.

BACKGROUND

1. Technical Field

The present disclosure relates to a method for manufacturing a blisk and also a blisk intermediate product.

2. Description of the Related Art

Compressors or turbines used in gas turbine engines which can be applied to aircraft engines often include blisks (bladed disks) serving as rotors. A blisk is made of a nickel alloy or a titanium alloy (a metal material), for example. The blisk includes a circular disk and a plurality of rotor blades arranged at regular intervals along the outer peripheral surface of the disk in its circumferential direction.

A blisk is typically manufactured in the following manner. A circular material made of a nickel alloy or the like is sequentially subjected to rough turning machining (a step of rough machining) and finish turning machining (a step of finish machining) in the middle portion with a disk cutting tool such as a bit, so that the middle portion of the circular material is finished into a product form (a final form). Thereafter, the circular material is sequentially subjected to rough milling (a step of rough machining) and finish milling (a step of finish machining) along the outer peripheral edge with a rotor blade cutting tool such as an end mill, so that the outer peripheral edge of the circular material is finished into a plurality of rotor blades in a product form. A blisk thus can be manufactured from the circular material.

Japanese Unexamined Patent Application Publication No. 2009-197649 (Patent Literature 1) is a publication of related art with regard to the present disclosure.

SUMMARY

Typically, rotor blades have low rigidity because a thickness of the rotor blades is thin and a span of the rotor blades is long. When the rotor blades are subjected to finish milling to be finished into a product form, chatter vibrations which may result in a reduction in finish accuracy tend to be caused. In order to ensure the finish accuracy of the rotor blades, namely, product accuracy (form accuracy) of a blisk, a cutting speed and a feed speed of a rotor blade cutting tool are generally reduced so as to suppress the chatter vibrations caused when the rotor blades are finished into a product form. However, the reduction in the cutting speed and the feed speed of the rotor blade cutting tool deteriorates surface conditions of the blisk thus obtained because of frictional heat caused between the rotor blade cutting tool and the work-hardened processed surface, and increases the cutting time to result in a reduction in productivity of the blisk.

An object of the present disclosure is to provide a method for manufacturing a blisk and also a blisk intermediate product contributing to enhancing productivity of the blisk while ensuring product accuracy.

A method for manufacturing a blisk according to an aspect of the present disclosure, which includes a circular disk and a plurality of rotor blades arranged at intervals in a circumferential direction along an outer peripheral surface of the disk, according to the present disclosure includes: an intermediate product molding step of molding a blisk intermediate product including a circular disk-corresponding part having a cutting margin in addition to the disk, a plurality of rotor blade-corresponding parts arranged at intervals in a circumferential direction along an outer peripheral surface of the disk-corresponding part and each having a cutting margin in addition to the respective rotor blades, and bridges each connecting a front edge of one of each pair of the rotor blade-corresponding parts adjacent to each other and a rear edge of another one of the rotor blade-corresponding parts; a disk finishing step of cutting the disk-corresponding part so as to finish the disk-corresponding part into a form of the disk; and a rotor blade finishing step of cutting each bridge so as to finish the respective rotor blade-corresponding parts into a form of the respective rotor blades.

A blisk intermediate product according to an aspect of the present disclosure, which is used for manufacturing a blisk including a circular disk and a plurality of rotor blades arranged at intervals in a circumferential direction along an outer peripheral surface of the disk, includes: a circular disk-corresponding part having a cutting margin in addition to the disk; a plurality of rotor blade-corresponding parts arranged at intervals in a circumferential direction along an outer peripheral surface of the disk-corresponding part and each having a cutting margin in addition to the respective rotor blades; and bridges each connecting a front edge of one of each pair of the rotor blade-corresponding parts adjacent to each other and a rear edge of another one of the rotor blade-corresponding parts.

DESCRIPTION OF THE EMBODIMENTS

Figure 1:
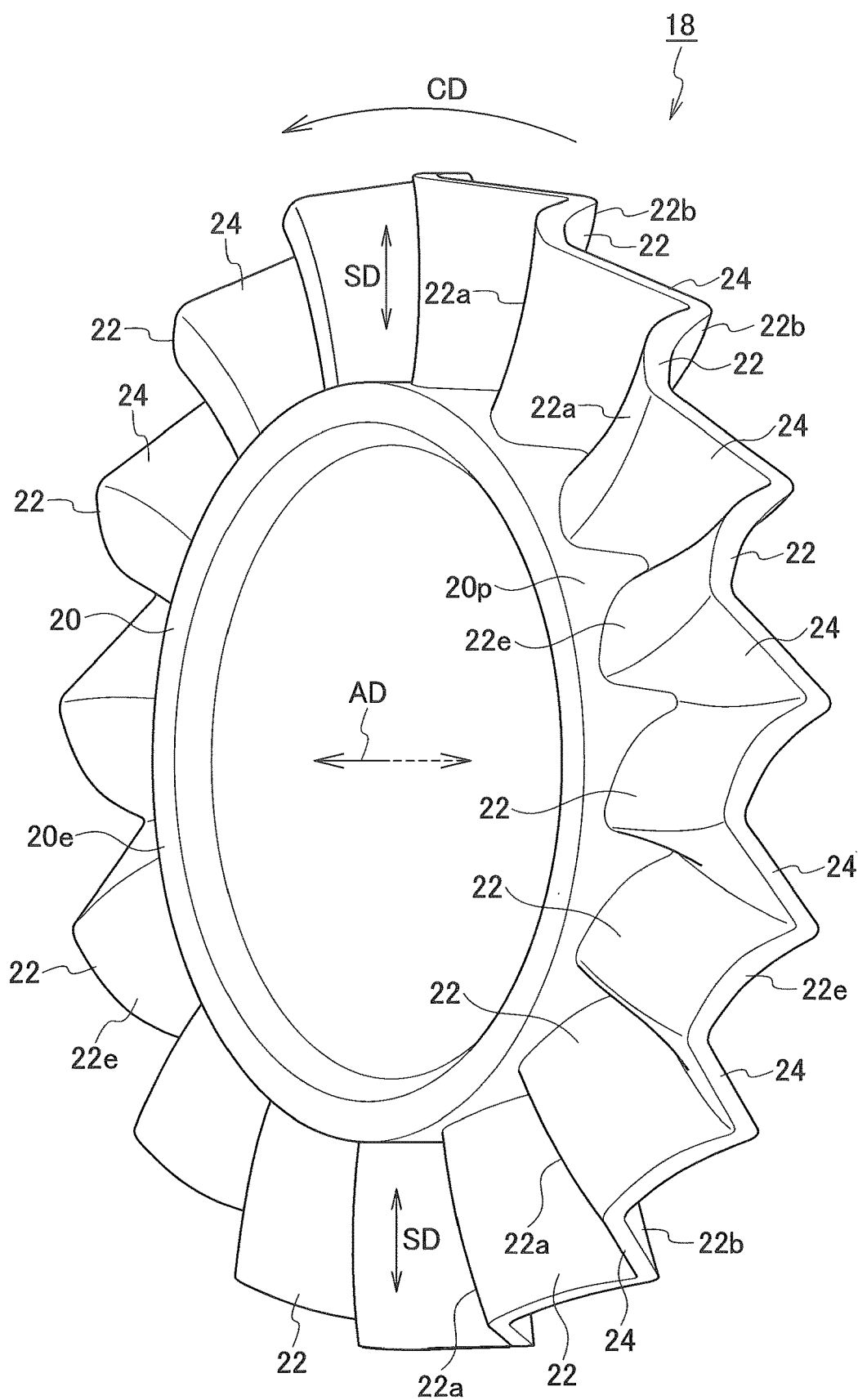
FIG. 1 is a perspective view of a blisk intermediate product according to an embodiment of the present disclosure.

A blisk intermediate product and a method for manufacturing a blisk according to an embodiment of the present disclosure will be described below with reference to the drawings. In the drawings, "U" refers to an upward direction (an upper side in a vertical direction), "D" refers to a downward direction (a lower side in the vertical direction), "AD" refers to an axial direction of the blisk or the blisk intermediate product, "CD" refers to a rotating direction of the blisk, "RD" refers to a radial direction of the blisk or the blisk intermediate product, and "SD" refers to a span direction of a rotor blade or a rotor blade-corresponding part. As used herein, the term "span direction" refers to a direction from a base side to a tip end of the rotor blade or the rotor blade-corresponding part. FIGS. 4A, 4B, 5A to 5C, 6A, 6B, 7A and 7B omit the indication of a bridge for brevity.

Figure 3:
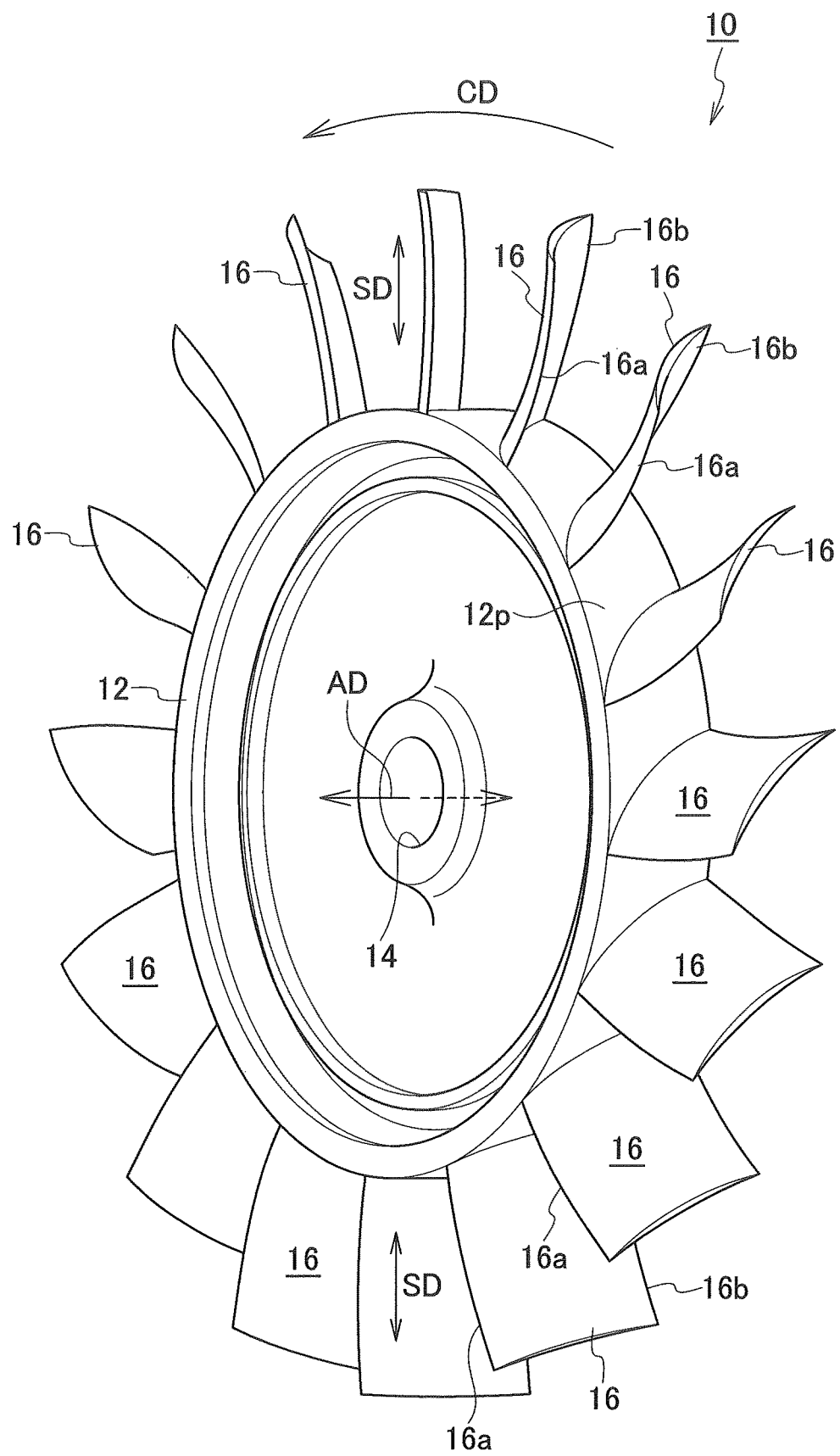
FIG. 3 is a perspective view of the blisk in a product form (a final form).

A blisk 10 to which the present embodiment is applicable is an integrally bladed disk having an integral form as shown in FIG. 3. The blisk 10 is used for a compressor (not shown) or a turbine (not shown) included in a gas turbine engine which can be applied to an aircraft engine. The blisk 10 is made of a nickel alloy or a titanium alloy (a metal material), for example.

The blisk 10 includes a circular disk 12. The disk 12 is provided with an insertion hole 14 in the middle to which a rotor shaft (not shown) of the compressor or the turbine is inserted. The insertion hole 14 penetrates the disk 12 in the axial direction of the blisk 10. A plurality of rotor blades 16 are arranged at regular intervals in a circumferential direction along an outer peripheral surface of the disk 12. A front edge 16a of a forward rotor blade 16 of each pair of the rotor blades 16 adjacent to each other is positioned on the front side of a rear edge 16b of a rearward rotor blade 16 in the rotating direction of the blisk 10. In other words, a space is open between each pair of the adjacent rotor blades 16 as viewed in the axial direction of the blisk 10. As used herein, the forward rotor blade 16 is a rotor blade 16 positioned forward in the rotating direction of the blisk 10, and the rearward rotor blade 16 is a rotor blade 16 positioned rearward in the rotating direction of the blisk 10.

Figure 2:
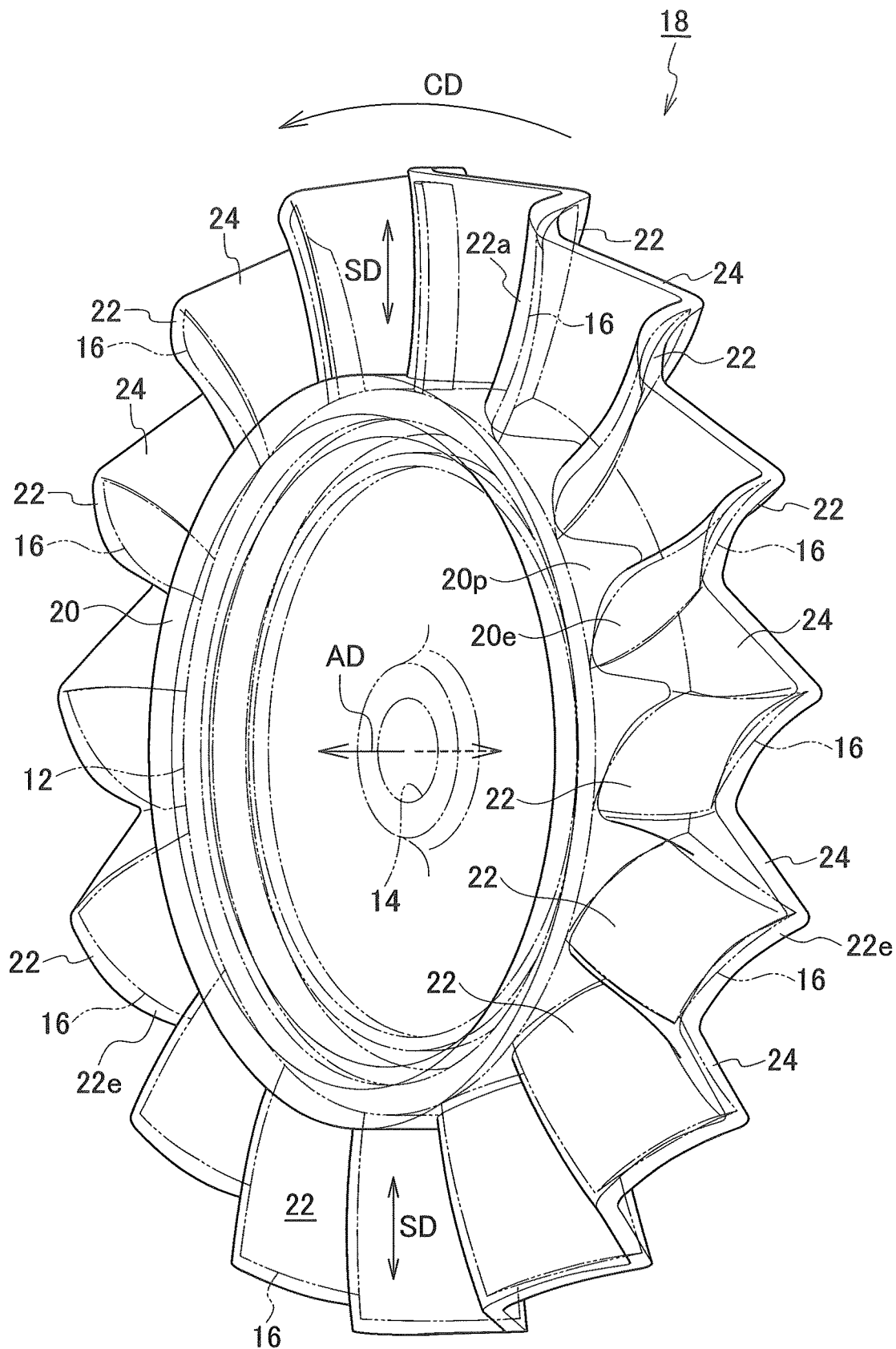
FIG. 2 is a perspective view showing a blisk indicated by the long dashed double-dotted lines added to FIG. 1.

As shown in FIG. 1 and FIG. 2, a blisk intermediate product 18 according to the present embodiment is an intermediate product obtained prior to the blisk 10 finished into a product form as shown in FIG. 3. The blisk intermediate product 18 is molded such that a metal block I (refer to FIG. 4A) made of a nickel alloy or the like is subjected to forging processing. Alternatively, the blisk intermediate product 18 may be molded by machining processing, electrolytic processing, or metal injection molding (MIM), instead of the forging processing.

The blisk intermediate product 18 includes a circular disk-corresponding part 20 including the disk 12. The disk-corresponding part 20 includes a cutting margin (an extra thickness) 20e on the convex side for performing finish processing. A plurality of rotor blade-corresponding portions 22 corresponding to the rotor blades 16 are arranged at regular intervals in a circumferential direction along an outer peripheral surface of the disk-corresponding part 20. Each of the rotor blade-corresponding portions 22 includes a cutting margin 22e on the convex side for performing finish processing.

The blisk intermediate product 18 includes a bridge 24 between each pair of the rotor blade-corresponding parts 22 adjacent to each other. The bridge 24 connects a front edge 22a of a forward rotor blade-corresponding part 22 of each pair of the adjacent rotor blade-corresponding parts 22 and a rear edge 22b of a rearward rotor blade-corresponding part 22 entirely in the span direction of the respective rotor blade-corresponding parts 22. The forward rotor blade-corresponding part 22 corresponds to the forward rotor blade 16, and the rear rotor blade-corresponding part 22 corresponds to the rearward rotor blade 16. Some of the bridges 24 may be provided with a notch (not shown), for example. The bridges 24 do not necessarily extend entirely along the rotor blade-corresponding parts 22 in the span direction. Instead of the case in which the respective bridges 24 connect the front edge 22a of the forward rotor blade-corresponding part 22 and the rear edge 22b of the rearward rotor blade-corresponding part 22, the respective bridges 24 may connect the rear edge 22b of the forward rotor blade-corresponding part 22 and the front edge 22a of the rearward rotor blade-corresponding part 22.

Next, a method for manufacturing the blisk 10 according to the present embodiment is described below.

The method for manufacturing the blisk 10 according to the present embodiment includes an intermediate product molding step, a first disk finishing step, a rotor blade finishing step, and a second disk finishing step. The respective steps in the method for manufacturing the blisk 10 according to the present embodiment are described in detail below.

(i) Intermediate Product Molding Step

Figure 4A:
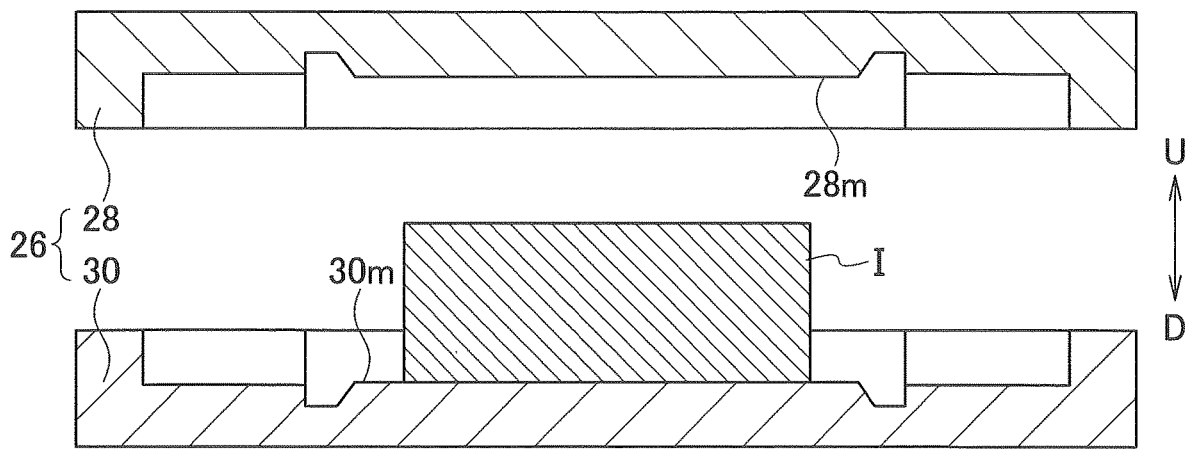
FIG. 4A is a schematic view for describing an intermediate product molding step in a manufacturing method for the blisk according to the embodiment of the present disclosure.
Figure 4B:
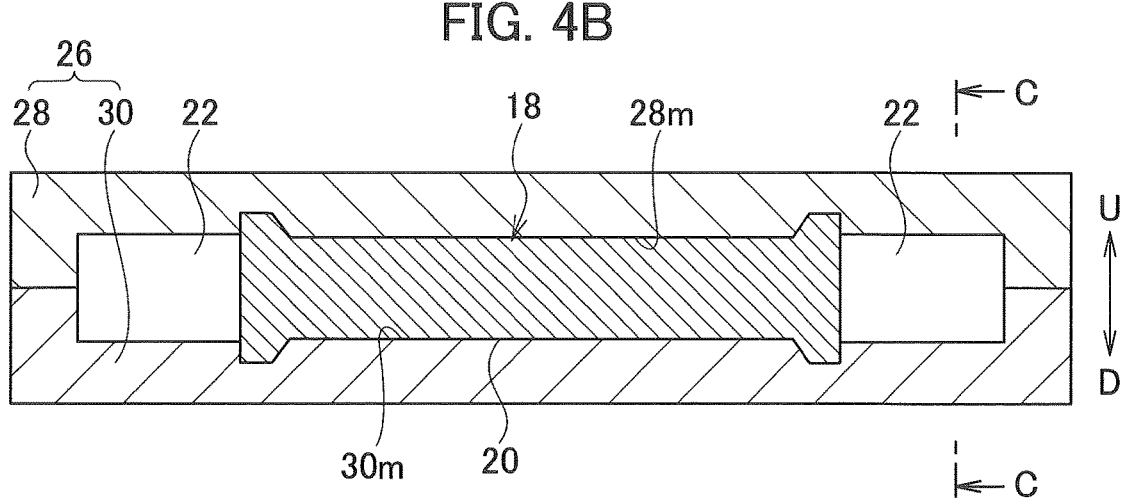
FIG. 4B is a schematic view for describing the intermediate product molding step in the manufacturing method for the blisk according to the embodiment of the present disclosure.
Figure 4C:
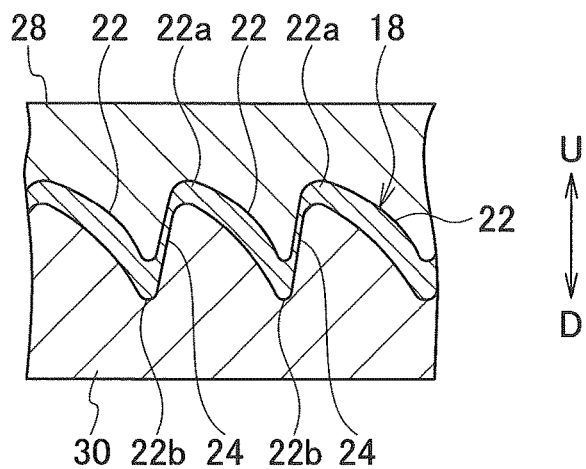
FIG. 4C is an enlarged cross-sectional view taken along line C-C in FIG. 4B.

The metal block I (refer to FIG. 4A) made of a nickel alloy or the like is preheated by a heater (not shown). The metal block I is placed between an upper mold 28 and a lower mold 30 of a forging mold 26 attached to a forging press (not shown), as shown in FIG. 4A. The upper mold 28 is attached to a slide (not shown) of the forging press and has a molding surface 28m conforming to the shape of the blisk intermediate product 18 on one side in the axial direction. The lower mold 30 is attached to a bolster (not shown) of the forging press and has a molding surface 30m opposed to the molding surface 28m in the vertical direction and conforming to the shape of the blisk intermediate product 18 on the other side in the axial direction. As shown in FIG. 4A and FIG. 4B, the forging press is operated to move the upper mold 28 downward integrally with the slide of the forging press, so that the forging processing is performed on the metal block I by use of the upper mold 28 and the lower mold 30 together. The blisk intermediate product 18 including the disk-corresponding part 20 and the plural rotor blade-corresponding parts 22 is thus molded from the metal block I.

Alternatively, a plurality of forging molds 26 having different shapes may be prepared so that the metal block I is subjected to the forging processing with the forging molds 26 in a phased manner. Although the present embodiment illustrates the case in which the blisk intermediate product 18 is molded by the forging processing, the blisk intermediate product 18 may be molded by machining processing, electrolytic processing, or metal injection molding, for example, instead of the forging processing.

(ii) First Disk Finishing Step

Figure 5A:
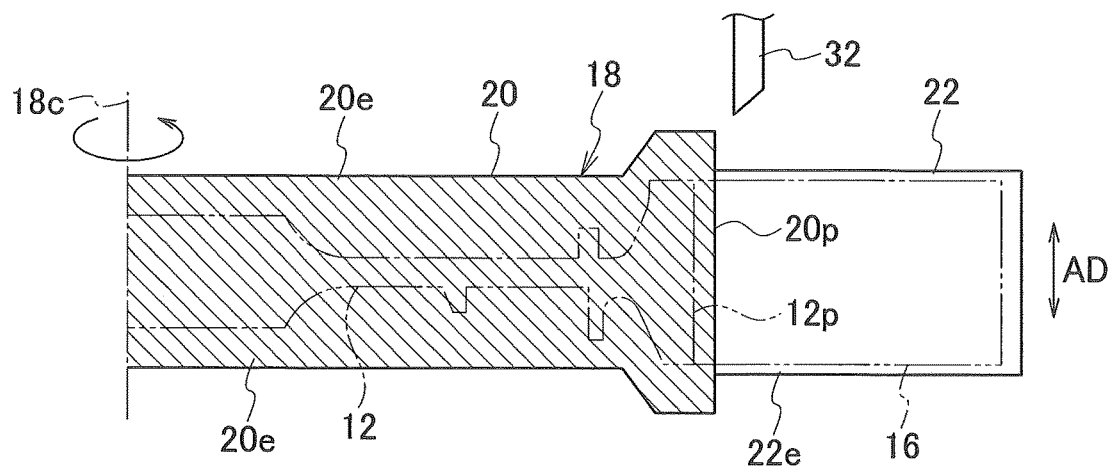
FIG. 5A is a schematic view for describing a first disk finishing step in the manufacturing method for the blisk according to the embodiment of the present disclosure.
Figure 5B:
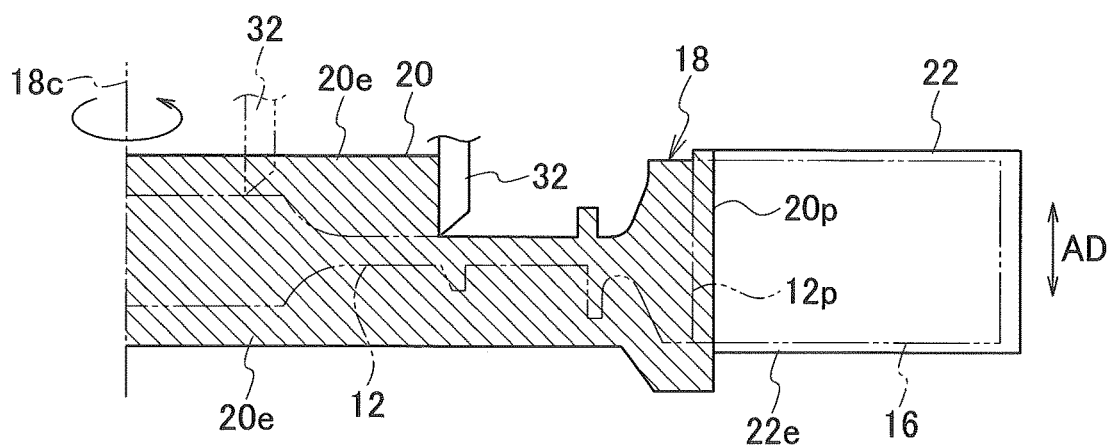
FIG. 5B is a schematic view for describing the first disk finishing step in the manufacturing method for the blisk according to the embodiment of the present disclosure.
Figure 5C:
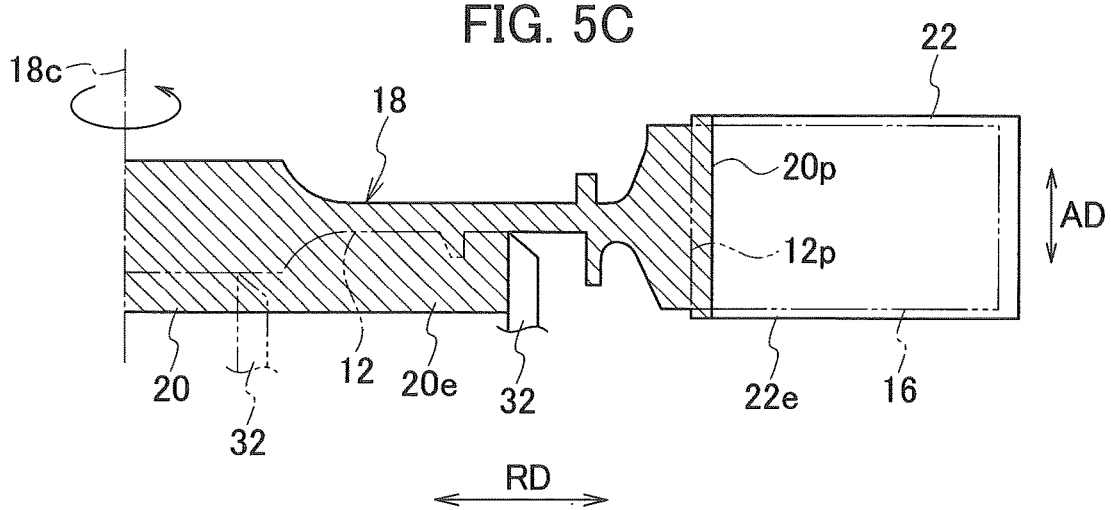
FIG. 5C is a schematic view for describing the first disk finishing step in the manufacturing method for the blisk according to the embodiment of the present disclosure.

The blisk intermediate product 18 is placed on a chuck of a lathe (not shown) after the intermediate product molding step is finished. Subsequently, a bit 32 serving as a disk cutting tool is attached to a tool holder (not shown) of the lathe, and the blisk intermediate product 18 is rotated on its axis 18c integrally with the chuck, as shown in FIG. 5A. The disk-corresponding part 20 on one side in the axial direction of the blisk intermediate product 18 is then notched with the bit 32, and the bit 32 is moved (fed) in the radial direction of the blisk intermediate product 18, as shown in FIG. 5B. Similarly, the disk-corresponding part 20 on the other side in the axial direction of the blisk intermediate product 18 is notched with the bit 32, and the bit 32 is moved in the radial direction of the blisk intermediate product 18, as shown in FIG. 5C. Thereafter, the disk-corresponding part 20 excluding the outer peripheral surface 20p is sequentially subjected to rough turning machining (a step of rough machining) and finish turning machining (a step of finish machining), so as to finish the disk-corresponding part 20 to obtain the disk 12 approximately conforming to a product form. As used herein, the phrase "approximately conforming to a product form" refers to a state in which the disk 12 excluding the outer peripheral surface 12p and the insertion hole 14 (refer to FIG. 3) is finished into a product form.

The bit 32 is replaced when the rough turning machining is shifted to the finish turning machining. The bit 32 may be replaced during the rough turning machining or the finish turning machining. The insertion hole 14 is preferably provided on the disk 12 by trimming and finish machining before the first disk finishing step is performed.

(iii) Rotor Blade Finishing Step

Figure 6A:
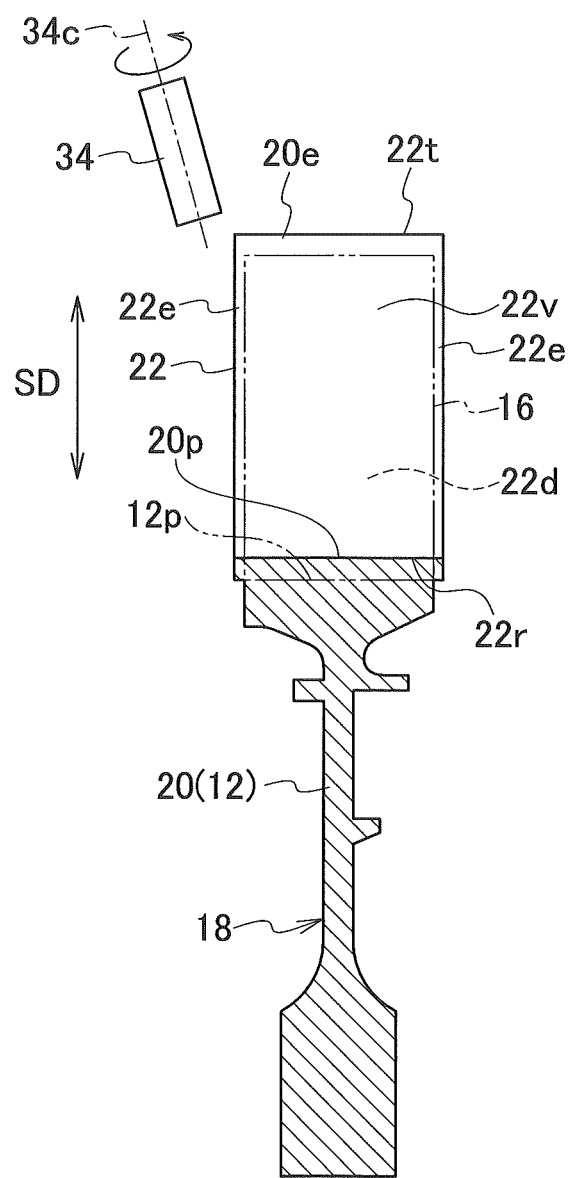
FIG. 6A is a schematic view for describing a rotor blade finishing step in the manufacturing method for the blisk according to the embodiment of the present disclosure.
Figure 6B:
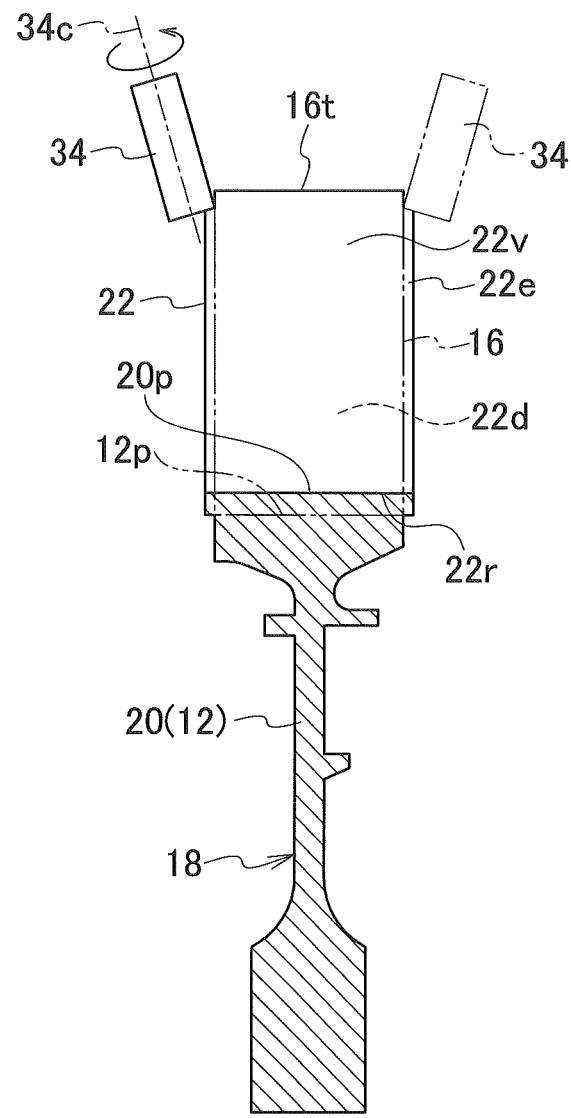
FIG. 6B is a schematic view for describing the rotor blade finishing step in the manufacturing method for the blisk according to the embodiment of the present disclosure.

The blisk intermediate product 18 is placed on a table of a milling machine (not shown) after the disk finishing step is finished. Subsequently, an end mill 34 serving as a rotor blade cutting tool is attached to a main spindle (not shown) of the milling machine, and the end mill 34 is rotated on its axis 34c integrally with the main spindle, as shown in FIG. 6A. Each rotor blade-corresponding part 22 on the tip 22t end (a part close to the tip 22t) is then notched with the end mill 34, and the end mill 34 is moved (fed) in the circumferential direction of each rotor blade-corresponding part 22, as shown in FIG. 6B. As used herein, the circumferential direction of each rotor blade-corresponding part 22 refers to a direction along the front edge 22a, a concave surface 22v, the rear edge 22b, and a convex back surface 22d of the rotor blade-corresponding part 22. Accordingly, the respective rotor blade-corresponding parts 22 on the tip 22t end can be subjected to rough milling (a step of rough machining), interim finish milling (a step of finish machining), and finish milling (a step of finish machining) while the respective bridges 24 are removed by milling. The bridges 24 remaining during the rough milling performed on the respective rotor blade-corresponding parts 22 on the tip 22t end can keep the rigidity of the respective rotor blade-corresponding parts 22.

Figure 7A:
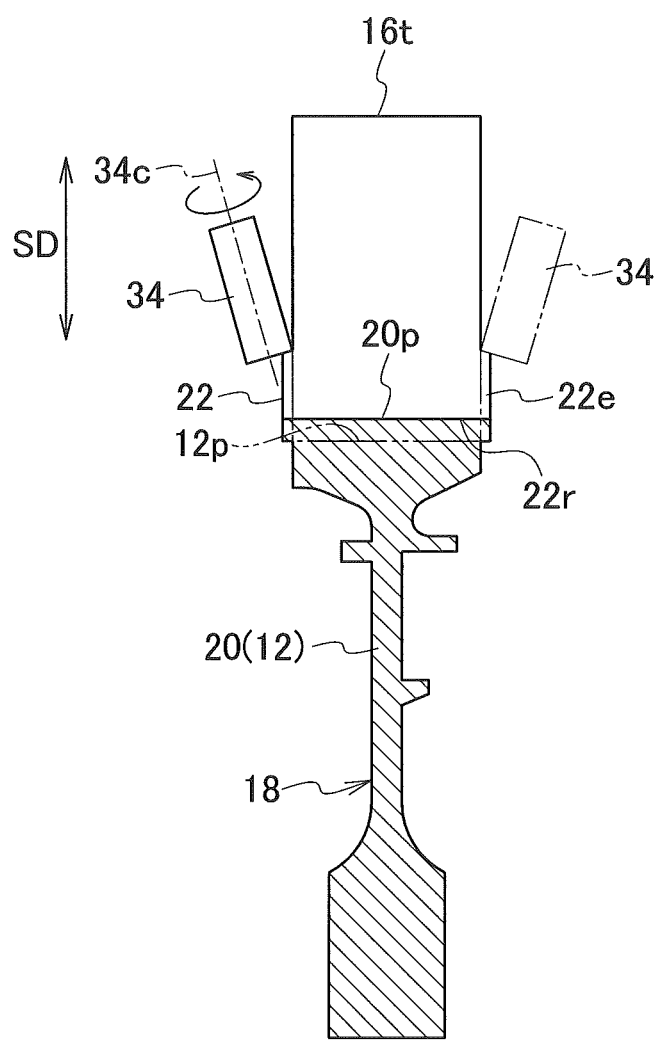
FIG. 7A is a schematic view for describing the rotor blade finishing step in the manufacturing method for the blisk according to the embodiment of the present disclosure.

Subsequently, the respective rotor blade-corresponding parts 22 are notched with the end mill 34, and the end mill 34 is moved in the circumferential direction of the respective rotor blade-corresponding parts 22 while the end mill 34 is caused to make a pitch movement in the span direction of the respective rotor blade-corresponding parts 22, as shown in FIG. 7A. The respective rotor blade-corresponding parts 22 are sequentially subjected to the rough milling, the interim finish milling, and the finish milling in the direction from the tip 22t end to the base 22r side while the respective bridges 24 are removed by milling, so as to finish the respective rotor blade-corresponding parts 22 to obtain the rotor blades 16 in a product form.

The end mill 34 is replaced when the rough milling is shifted to the interim finish milling or when the interim finish milling is shifted to the finish milling. The rough milling or the interim finish milling may be omitted.

(iv) Second Disk Finishing Step

Figure 7B:
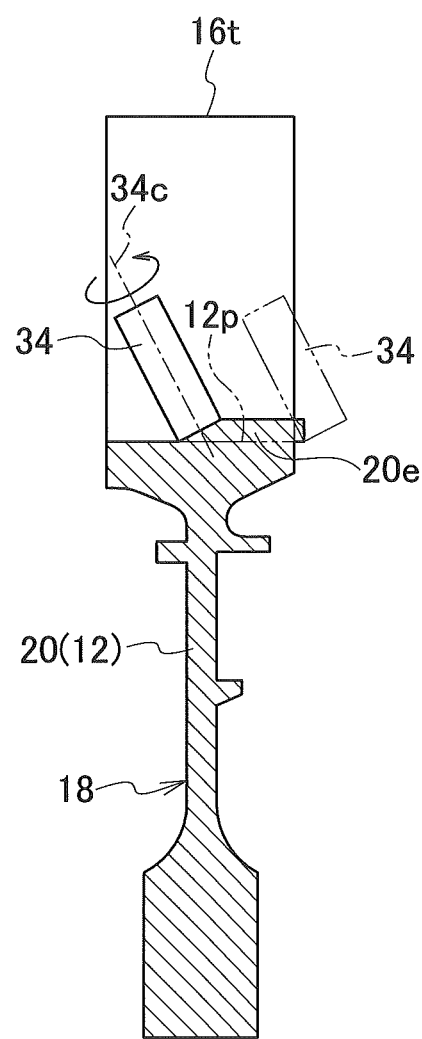
FIG. 7B is a schematic view for describing a second disk finishing step in the manufacturing method for the blisk according to the embodiment of the present disclosure.

The end mill 34 serving as a disk cutting tool is rotated on its axis 34c integrally with the main spindle during the rotor blade finishing step or after the rotor blade finishing step, as shown in FIG. 7B. The disk-corresponding portion 20 is notched with the end mill 34, and the end mill 34 is moved between the rotor blades 16 (the rotor blade-corresponding parts 22) adjacent to each other. The outer peripheral surface 20p of the disk-corresponding part 20 is then subjected to finish milling (a step of finish machining), so as to finish the disk-corresponding part 20 to obtain the disk 12 in a product form.

The blink 10 including the disk 12 and the plural rotor blades 16 can be manufactured from the metal block I accordingly.

The rotor blade finishing step may be performed not after the first disk finishing step but after the intermediate product molding step and before the first disk finishing step.

The operations and effects according to the present embodiment are described below.

The front edge 22a of the forward rotor blade-corresponding part 22 and the rear edge 22b of the rearward rotor blade-corresponding part 22 of each pair of the rotor blade-corresponding parts 22 adjacent to each other are connected via the bridge 24. Thus, the rigidity of the respective rotor blade-corresponding parts 22 having a thin thickness and a long span can sufficiently be ensured. Accordingly, chatter vibrations caused during the step of finishing the rotor blades 16 into a product form can be suppressed without a reduction in cutting speed or feed speed of the end mill 34.

The blisk intermediate product 18 including the plural rotor blade-corresponding parts 22 is molded such that the metal block I is subjected to the forging processing. The amount of milling (the amount of cuttings) necessary for finishing the plural rotor blades 16, namely, the amount of cuttings produced until the blisk 10 is manufactured thus can greatly be reduced. In addition, the amount (volume) of the metal block 1 as a material to be input also can greatly be reduced.

According to the present embodiment, chatter vibrations caused during the step of finishing the rotor blades 16 into a product form can be suppressed without a reduction in cutting speed or feed speed of the end mill 34, as described above. The present embodiment thus can enhance the productivity of the blisk 10 while sufficiently ensuring finish accuracy of the rotor blades 16, namely, product accuracy (form accuracy) of the blisk 10.

According to the present embodiment, the amount of cuttings inevitably caused during the manufacture of the blisk 10 can greatly be reduced, so as to further improve the productivity of the blisk 10 and minimize deterioration of the end mill 34.

According to the present embodiment, the amount of the metal block I as a material to be input can greatly be reduced, so as to reduce the material cost for the blisk 10 to result in a great reduction in production cost of the blisk 10.

It should be noted that the present disclosure includes various embodiments which are not described herein. Therefore, the scope of the present disclosure is defined only by the scope of the appended claims reasonably derived from the description described above.

What is claimed is:

1. A method for manufacturing a blisk including a circular disk and a plurality of rotor blades arranged at intervals in a circumferential direction along an outer peripheral surface of the disk, the method comprising:
    an intermediate product molding step of molding a blisk intermediate product including a circular disk-corresponding part having a cutting margin in addition to the disk, a plurality of rotor blade-corresponding parts arranged at intervals in a circumferential direction along an outer peripheral surface of the disk-corresponding part and each having a cutting margin in addition to the respective rotor blades, and bridges each connecting a front edge of one of each pair of the rotor blade-corresponding parts adjacent to each other and a rear edge of another one of the rotor blade-corresponding parts;
    a disk finishing step of cutting the disk-corresponding part so as to finish the disk-corresponding part into a form of the disk; and
    a rotor blade finishing step of sequentially cutting the respective rotor blade-corresponding parts in a direction from a tip end to a base side of the respective rotor blade-corresponding parts while each bridge is removed so as to finish the respective rotor blade-corresponding parts into a form of the respective rotor blades,
    wherein the blisk intermediate product is molded such that a metal block is subjected to forging processing in the intermediate product molding step.

2. The method for manufacturing the blisk according to claim 1, wherein each bridge connects the front edge of one of each pair of the rotor blade-corresponding parts adjacent to each other and the rear edge of the other one of the rotor blade-corresponding parts entirely in a direction from the base side to the tip end of the respective rotor blade-corresponding parts.

3. The method for manufacturing the blisk according to claim 1, wherein the sequentially cutting of the respective rotor blade-corresponding parts in the direction from the tip end to the base side of the respective rotor blade-corresponding parts includes rough milling, interim finish milling, and finish milling.

* * * * *